United States Patent
Anuar Or et al.

(10) Patent No.: US 11,334,799 B2
(45) Date of Patent: May 17, 2022

(54) SYSTEM AND METHOD FOR ORDINAL CLASSIFICATION USING A RISK-BASED WEIGHTED INFORMATION GAIN MEASURE

(71) Applicant: C-B4 Context Based Forecasting LTD., Herzelia (IL)

(72) Inventors: Roee Eli Anuar Or, Givatayim (IL); Gonen Singer, Kfar Saba (IL)

(73) Assignee: C-B4 CONTEXT BASED FORECASTING LTD, Herzelia (IL)

( * ) Notice: Subject to any disclaimer, the term of this patent is extended or adjusted under 35 U.S.C. 154(b) by 309 days.

(21) Appl. No.: 16/716,529

(22) Filed: Dec. 17, 2019

(65) Prior Publication Data

US 2020/0210784 A1 Jul. 2, 2020

Related U.S. Application Data

(60) Provisional application No. 62/873,993, filed on Jul. 15, 2019, provisional application No. 62/784,856, filed on Dec. 26, 2018.

(51) Int. Cl.
*G06N 5/00* (2006.01)
*G06K 9/62* (2022.01)
*G06N 20/00* (2019.01)
*G06N 5/02* (2006.01)
*G06Q 30/02* (2012.01)
*G06Q 10/06* (2012.01)

(52) U.S. Cl.
CPC .......... *G06N 5/003* (2013.01); *G06K 9/6231* (2013.01); *G06K 9/6282* (2013.01); *G06N 5/025* (2013.01); *G06N 20/00* (2019.01); *G06Q 10/067* (2013.01); *G06Q 30/0202* (2013.01)

(58) Field of Classification Search
CPC combination set(s) only.
See application file for complete search history.

(56) References Cited

U.S. PATENT DOCUMENTS

| | | | |
|---|---|---|---|
| 2003/0217052 A1* | 11/2003 | Rubenczyk | G06F 16/3323 |
| 2013/0111005 A1* | 5/2013 | Chu | G06N 7/005 |
| | | | 709/224 |
| 2015/0254230 A1* | 9/2015 | Papadopoullos | G06F 16/31 |
| | | | 704/8 |
| 2018/0121533 A1* | 5/2018 | Magnani | G06F 16/248 |
| 2020/0365268 A1* | 11/2020 | Michuda | G16B 30/00 |
| 2021/0142904 A1* | 5/2021 | Michuda | G16B 20/20 |

OTHER PUBLICATIONS

Potharst, Rob & Bioch, Jan. 1999. A Decision Tree Algorithm for Ordinal Classification. Advances in Intelligent Data Analysis, Proceedings, vol. 1642. 187-198. 10.1007/3-540-48412-4_16. (Year: 1999).*

* cited by examiner

*Primary Examiner* — Fayyaz Alam

(57) ABSTRACT

A system, the system comprising processing circuitry configured to: obtain an ordinal decision-tree classifier generated by taking into account an ordinality of classes of an ordinal class variable having at least three classes; and classify an input record to a given class of the classes using the ordinal decision-tree classifier.

18 Claims, 6 Drawing Sheets

```
Algorithm 1: Tree Growing

1.  Procedure BuildTree(D)
2.      wMax ← 0
3.      jMax ← 0
4.      For j in 1 to J:
5.          WIGRj ← WIGR_j(D)
6.          If WIGRj>wMax:
7.              wMax ← WIGRj
8.              jMax ← j
9.      If wMax>0:
10.         For r in 1 to a_{jMax}:
11.             Call BuildTree(D^r_{jMax})
12.     Else end procedure
```

SYSTEM AND METHOD FOR ORDINAL CLASSIFICATION USING A RISK-BASED WEIGHTED INFORMATION GAIN MEASURE

INCORPORATION BY REFERENCE

U.S. Provisional Application Nos. 62/784,856 and 62/873,993 are incorporated by reference herein.

TECHNICAL FIELD

The invention relates to a system and method for ordinal classification using a risk-based weighted information gain measure.

BACKGROUND

Decision-tree algorithms are known to be efficient and interpretable models for representing classification problems. In most of these algorithms, including ID3, C4.5, and Random Forest, Shannon's entropy (referred to herein, interchangeably, as "conventional entropy") is used to calculate, at each node of a decision tree, an information gain measure for each respective attribute in a data set associated with the respective node. Moreover, at each node of the decision tree, if a splitting attribute is selected, it is selected to be the respective attribute having the highest information gain measure that is calculated based on the conventional entropy. This presents a problem for the generation of decision trees for data sets having an ordinal class variable (i.e., an ordinal target), since conventional entropy only considers a probability distribution of classes of a class variable without considering the reward values and risk effects of the classes.

For example, an ordinal class variable could include four classes that are associated with a profit (e.g., loss, low profit, medium profit, high profit) earned on related-related transactions. The conventional entropy that is measured for a first vector (30%, 10%, 20%, 40%) representing a probability distribution of profit earned (e.g., loss, low profit, medium profit, high profit, respectively) on retail-related transactions is identical to the conventional entropy that is measured for a second vector (10%, 30%, 40%, 20%) representing a probability distribution of profit earned (e.g., loss, low profit, medium profit, high profit, respectively) on retail-related transactions, notwithstanding that the potential risks and rewards regarding the probability distribution of profit earned on retail-related transactions associated with the first vector are different than the potential risks and rewards regarding the probability distribution of profit earned on retail-related transactions associated with the second vector.

It is an object of the present invention to generate an ordinal decision-tree classifier for a data set having an ordinal class variable by using a weighted information gain measure as a criterion for selecting the splitting attributes of the ordinal decision-tree classifier, the weighted information gain measure considering the reward values and risk effects of the classes of the ordinal class variable. Such an ordinal decision-tree classifier can be used for assessing, for example, a reward or risk level of a retail transaction(s), a risk level of a loan(s), a risk level of an investment(s), severity of a bug or manufacturing defect(s), or a priority level of a reservation(s).

GENERAL DESCRIPTION

In accordance with a first aspect of the presently disclosed subject matter, there is provided a system, the system comprising processing circuitry configured to: obtain an ordinal decision-tree classifier generated by taking into account an ordinality of classes of an ordinal class variable having at least three classes; and classify an input record to a given class of the classes using the ordinal decision-tree classifier.

In some cases, (a) the ordinal decision-tree classifier has a plurality of levels, at each level each node is connected to a plurality of child nodes, if any, via respective edges, each edge of the edges connecting a given node to its respective child node and representing a respective distinct value or range of values of a splitting attribute; (b) the splitting attribute is selected taking into account the ordinality of the classes of the ordinal class variable; and (c) each node represents a probability distribution of the classes of the ordinal class variable within a respective node data set, being a respective subset of the node data set of a parent node thereof, if any, wherein the subset is selected in accordance with the splitting attribute value or range of values of the parent node.

In some cases, the splitting attribute is selected to be an attribute of the parent node having the highest positive information gain measure, wherein the information gain measure is calculated by allocating state-dependent weights for the classes, wherein each of the state dependent weights is based on a proximity of the corresponding class to a center of the classes.

In some cases, the processing circuitry is further configured to perform the following for generating the obtained ordinal decision-tree classifier: (a) obtain a data set, the obtained data set including a plurality of records, wherein each record of the plurality of records is indicative of a relationship between one or more attribute values or range of values of a corresponding one or more attributes and a class of the classes of the ordinal class variable; (b) generate a node forming part of the ordinal decision-tree classifier, the node being representative of a probability distribution of the classes in the obtained data set; (c) for each respective attribute of the attributes, calculate a Weighted Information Gain (WIG) measure of the respective attribute over the obtained data set, the WIG measure taking into account the ordinality of the classes of the ordinal class variable: (d) select the attribute having the highest positive WIG measure, if any, as a splitting attribute; (e) upon selection of the splitting attribute, generate one or more edges connecting the node to one or more respective child nodes, each edge of the edges being associated with a respective attribute value or range of values of the splitting attribute, and wherein each of the child nodes is representative of a probability distribution of the classes over a subset of the obtained data set associated with a respective attribute value or range of values of the splitting attribute; and (f) recursively repeat steps (a) through (e) for each subset of subsets of the obtained data set, wherein the respective subset becomes the obtained data set, and wherein the generated node is the respective child node associated with the respective subset, until a WIG measure of each of the attributes in the respective subset has a zero or a negative value or a depth of the ordinal decision-tree classifier has reached a maximum predetermined value.

In some cases, the processing circuitry is further configured to perform the following in order to calculate the WIG measure of the respective attribute over the obtained data set: allocate data set state-dependent weights for the classes in the obtained data set, each class of the classes in the obtained data set being allocated a state-dependent weight of the data set state-dependent weights based on the proximity of the respective class to one or more center classes of the classes in the obtained data set; calculate a data set weighted information entropy for the obtained data set, in accordance with the data set state-dependent weights; split the node into a plurality of potential child nodes, wherein the potential child nodes are representative of a probability distribution of the classes in corresponding potential subsets of the obtained data set associated with corresponding attribute values or range of values of the respective attribute; for each potential subset of the potential subsets: allocate subset state-dependent weights for the classes in the respective potential subset, each class of the classes in the respective potential subset being allocated a subset state-dependent weight of the subset state-dependent weights based on the proximity of the respective class to one or more center classes of the classes in the respective potential subset; and calculate a potential subset weighted information entropy for the respective potential subset, in accordance with the subset state-dependent weights for the classes in the respective potential subset; calculate an average weighted information entropy of the respective attribute over the obtained data set based on the potential subset weighted information entropies; and calculate the WIG measure based on a difference between the data set weighted information entropy and the average weighted information entropy.

In some cases, the processing circuitry is configured to calculate the data set weighted information entropy as follows:

$$WH(D) = -\sum_{i=1}^{n} k_i(D) p_i \log p_i,$$

wherein D is the obtained data set; wherein $p_i$ is a probability of an appearance of a given class, $C_i$, of the classes in the obtained data set, wherein $k_i(D)$ is a value of the data set state-dependent weight for the given class, wherein n is the number of classes in the obtained data set, and wherein $k_i(D)$ is calculated as follows:

$$k_i(D) = \beta \left( \frac{|V(C_i) - V(C^m(D))|^\alpha}{\sum_{i=1}^{n} |V(C_i) - V(C^m(D))|^\alpha} \right),$$

wherein $V(C_i)$ is a value of the given class, wherein $V(C^m(D))$ is a value of a center class or classes in the obtained data set, wherein $\alpha$ is a normalization factor that represents units of a gain value, $\alpha$ being greater than zero, and wherein $\beta$ is a non-zero constant.

In some cases, the processing circuitry is configured to calculate the potential subset weighted information entropy for the respective potential subset as follows:

$$WH(D_j^r) = -\sum_{i=1}^{n} k_i(D_j^r) p_i \log p_i,$$

wherein $D_j^r$ is the respective potential subset; wherein $p_i$ is a probability of an appearance of a given class, $C_i$, of the classes in the respective potential subset, wherein $k_i(D_j^r)$ is a value of the subset state-dependent weight for the given class, wherein n is the number of classes in the respective potential subset, and wherein $k_i(D_j^r)$ is calculated as follows:

$$k_i(D_j^r) = \beta \left( \frac{|V(C_i) - V(C^m(D_j^r))|^\alpha}{\sum_{i=1}^{n} |V(C_i) - V(C^m(D_j^r))|^\alpha} \right),$$

wherein $V(C_i)$ is a value of the given class, wherein $V(C^m(D_j^r))$ is a value of a center class or classes in the respective potential subset, wherein $\alpha$ is a normalization factor that represents units of a gain value, $\alpha$ being greater than zero, and wherein $\beta$ is a non-zero constant.

In some cases, the processing circuitry is configured to calculate the average weighted information entropy as follows:

$$WH_j(D) = \sum_{r=1}^{a_j} \frac{|D_j^r|}{|D|} \times WH(D_j^r),$$

where $$\frac{|D_j^r|}{|D|}$$

represents a proportion of the records of the data set for which the respective attribute has a respective attribute value or range of values, $A_j^r$, wherein $a_j$ is the number of attribute values or range of values of the respective attribute, and wherein $WH(D_j^r)$ is the potential subset weighted information entropy for a respective potential subset of the potential subsets.

In some cases, the WIG measure is a WIG, and the processing circuitry is configured to calculate the WIG as follows:

$$WIG_j(D) = WH(D) - WH_j(D),$$

wherein $WH(D)$ is the data set weighted information entropy, and wherein $WH_j(D)$ is the average weighted information entropy.

In some cases, the WIG measure is a normalized weighted information gain ratio (WIGR), and the processing circuitry is configured to calculate the normalized WIGR as follows:

$$WIGR_j(D) = \frac{WIG_j(D)}{H_j(D)},$$

wherein $WIG_j(D)$ is a WIG, wherein the processing circuitry is configured to calculate the WIG as follows:

$$WIG_j(D) = WH(D) - WH_j(D),$$

$WH(D)$ being the data set weighted information entropy, and $WH_j(D)$ being the average weighted information entropy, and wherein $H_j(D)$ is a partition entropy of the respective attribute, the processing circuitry being configured to calculate $H_j(D)$ as follows:

$$H_j(D) = -\sum_{r=1}^{a_j} \frac{|D_j^r|}{|D|} \times \log\left(\frac{|D_j^r|}{|D|}\right),$$

wherein $$\frac{|D_j^r|}{|D|}$$

represents a proportion of the records of the data set for which the respective attribute has a respective attribute value or range of values, $A_j^r$, and wherein $a_j$ is the number of attribute values or range of values of the respective attribute.

In some cases, the classes are associated with one of the following: a. values of retail transactions; b. returns on investments; c. risk levels of loans; d. degrees of severity of bugs or manufacturing defects; or e. priority levels of reservations.

In some cases, the classes are associated with values of retail transactions, the ordinal decision-tree classifier is generated using a retail related data set comprising records associated with past retail transactions, and the input record is a current retail transaction to be classified to a class using the ordinal decision-tree classifier.

In some cases, the classes are associated with returns on investments, the ordinal decision-tree classifier is generated using an investment related data set comprising records associated with past investments, and the input record is a current investment to be classified to a class using the ordinal decision-tree classifier.

In accordance with a second aspect of the presently disclosed subject matter, there is provided a system comprising processing circuitry, wherein the processing circuitry is configured to generate an ordinal decision-tree classifier having a plurality of levels, wherein at each level each node of the ordinal decision-tree classifier is connected to a plurality of child nodes via respective edges, wherein each edge at each given level of the levels represents a respective distinct value or range of values of a splitting attribute, and wherein the splitting attribute is selected taking into account an ordinality of classes of an ordinal class variable.

In accordance with a third aspect of the presently disclosed subject matter, there is provided a method, the method comprising: obtaining, by processing circuitry, an ordinal decision-tree classifier generated by taking into account an ordinality of classes of an ordinal class variable having at least three classes; and classifying an input record to a given class of the classes using the ordinal decision-tree classifier.

In some cases, (a) the ordinal decision-tree classifier has a plurality of levels, at each level each node is connected to a plurality of child nodes, if any, via respective edges, each edge of the edges connecting a given node to its respective child node and representing a respective distinct value or range of values of a splitting attribute; (b) the splitting attribute is selected taking into account the ordinality of the classes of the ordinal class variable; and (c) each node represents a probability distribution of the classes of the ordinal class variable within a respective node data set, being a respective subset of the node data set of a parent node thereof, if any, wherein the subset is selected in accordance with the splitting attribute value or range of values of the parent node.

In some cases, the splitting attribute is selected to be an attribute of the parent node having the highest positive information gain measure, wherein the information gain measure is calculated by allocating state-dependent weights for the classes, wherein each of the state dependent weights is based on a proximity of the corresponding class to a center of the classes.

In some cases, the method further comprises: generating the obtained ordinal decision-tree classifier, by the processing circuitry, the generating comprising: (a) obtaining a data set, the obtained data set including a plurality of records, wherein each record of the plurality of records is indicative of a relationship between one or more attribute values or range of values of a corresponding one or more attributes and a class of the classes of the ordinal class variable; (b) generating a node forming part of the ordinal decision-tree classifier, the node being representative of a probability distribution of the classes in the obtained data set; (c) for each respective attribute of the attributes, calculating a Weighted Information Gain (WIG) measure of the respective attribute over the obtained data set, the WIG measure taking into account the ordinality of the classes of the ordinal class variable; (d) selecting the attribute having the highest positive WIG measure, if any, as a splitting attribute; (e) upon selection of the splitting attribute, generating one or more edges connecting the node to one or more respective child nodes, each edge of the edges being associated with a respective attribute value or range of values of the splitting attribute, and wherein each of the child nodes is representative of a probability distribution of the classes over a subset of the obtained data set associated with a respective attribute value or range of values of the splitting attribute; and (f) recursively repeating steps (a) through (e) for each subset of subsets of the obtained data set, wherein the respective subset becomes the obtained data set, and wherein the generated node is the respective child node associated with the respective subset, until a WIG measure of each of the attributes in the respective subset has a zero or a negative value or a depth of the ordinal decision-tree classifier has reached a maximum predetermined value.

In some cases, the calculating comprises: allocating data set state-dependent weights for the classes in the obtained data set, each class of the classes in the obtained data set being allocated a state-dependent weight of the data set state-dependent weights based on the proximity of the respective class to one or more center classes of the classes in the obtained data set: calculating a data set weighted information entropy for the obtained data set, in accordance with the data set state-dependent weights; splitting the node into a plurality of potential child nodes, wherein the potential child nodes are representative of a probability distribution of the classes in corresponding potential subsets of the obtained data set associated with corresponding attribute values or range of values of the respective attribute; for each potential subset of the potential subsets: allocating subset state-dependent weights for the classes in the respective potential subset, each class of the classes in the respective potential subset being allocated a subset state-dependent weight of the subset state-dependent weights based on the proximity of the respective class to one or more center classes of the classes in the respective potential subset; and calculating a potential subset weighted information entropy for the respective potential subset, in accordance with the subset state-dependent weights for the classes in the respective potential subset; calculating an average weighted information entropy of the respective attribute over the obtained data set based on the potential subset weighted information entropies; and calculating the WIG measure based on a difference between the data set weighted information entropy and the average weighted information entropy.

In some cases, the calculating of the data set weighted information entropy is performed as follows:

$$WH(D) = -\sum_{i=1}^{n} k_i(D) p_i \log p_i,$$

wherein D is the obtained data set; wherein $p_i$ is a probability of an appearance of a given class, $C_i$, of the classes in the obtained data set, wherein $k_i(D)$ is a value of the data set state-dependent weight for the given class, wherein n is the number of classes in the obtained data set, and wherein $k_i(D)$ is calculated as follows:

$$k_i(D) = \beta \left( \frac{|V(C_i) - V(C^m(D))|^\alpha}{\sum_{i=1}^{n} |V(C_i) - V(C^m(D))|^\alpha} \right),$$

wherein $V(C_i)$ is a value of the given class, wherein $V(C^m(D))$ is a value of a center class or classes in the obtained data set, wherein $\alpha$ is a normalization factor that represents units of a gain value, $\alpha$ being greater than zero, and wherein $\beta$ is a non-zero constant.

In some cases, the calculating of the potential subset weighted information entropy for the respective potential subset is performed as follows:

$$WH(D_j^r) = -\sum_{i=1}^{n} k_i(D_j^r) p_i \log p_i,$$

wherein $D_j^r$ is the respective potential subset; wherein $p_i$ is a probability of an appearance of a given class, $C_i$, of the classes in the respective potential subset, wherein $k_i(D_j^r)$ is a value of the subset state-dependent weight for the given class, wherein n is the number of classes in the respective potential subset, and wherein $k_i(D_j^r)$ is calculated as follows:

$$k_i(D_j^r) = \beta \left( \frac{|V(C_i) - V(C^m(D_j^r))|^\alpha}{\sum_{i=1}^{n} |V(C_i) - V(C^m(D_j^r))|^\alpha} \right),$$

wherein $V(C_i)$ is a value of the given class, wherein $V(C^m(D_j^r))$ is a value of a center class or classes in the respective potential subset, wherein $\alpha$ is a normalization factor that represents units of a gain value, $\alpha$ being greater than zero, and wherein $\beta$ is a non-zero constant.

In some cases, the calculating of the average weighted information entropy is performed as follows:

$$WH_j(D) = \sum_{r=1}^{a_j} \frac{|D_j^r|}{|D|} \times WH(D_j^r),$$

wherein $$\frac{|D_j^r|}{|D|}$$

represents a proportion of the records of the data set for which the respective attribute has a respective attribute value or range of values, $A_j^r$, wherein $a_j$ is the number of attribute values or range of values of the respective attribute, and wherein $WH(D_j^r)$ is the potential subset weighted information entropy for a respective potential subset of the potential subsets.

In some cases, the WIG measure is a WIG, and calculating of the WIG is performed as follows:

$$WIG_j(D) = WH(D) - WH_j(D),$$

wherein $WH(D)$ is the data set weighted information entropy, and wherein $WH_j(D)$ is the average weighted information entropy.

In some cases, the WIG measure is a normalized weighted information gain ratio (WIGR), and calculating of the normalized WIGR is performed as follows:

$$WIGR_j(D) = \frac{WIG_j(D)}{H_j(D)},$$

wherein $WIG_j(D)$ is a WIG,
wherein calculating of the WIG is performed as follows:

$$WIG_j(D) = WH(D) - WH_j(D),$$

$WH(D)$ being the data set weighted information entropy, and $WH_j(D)$ being the average weighted information entropy, and wherein $H_j(D)$ is a partition entropy of the respective attribute, and is calculated as follows:

$$H_j(D) = -\sum_{r=1}^{a_j} \frac{|D_j^r|}{|D|} \times \log\left(\frac{|D_j^r|}{|D|}\right),$$

wherein $$\frac{|D_j^r|}{|D|}$$

represents a proportion of the records of the data set for which the respective attribute has a respective attribute value or range of values, $A_j^r$, and wherein $a_j$ is the number of attribute values or range of values of the respective attribute.

In some cases, the classes are associated with one of the following: a. values of retail transactions; b. returns on investments; c. risk levels of loans; d. degrees of severity of bugs or manufacturing defects; or e. priority levels of reservations.

In some cases, the classes are associated with values of retail transactions, the ordinal decision-tree classifier is generated using a retail related data set comprising records associated with past retail transactions, and the input record is a current retail transaction to be classified to a class using the ordinal decision-tree classifier.

In some cases, the classes are associated with returns on investments, the ordinal decision-tree classifier is generated using an investment related data set comprising records associated with past investments, and the input record is a current investment to be classified to a class using the ordinal decision-tree classifier.

In accordance with a fourth aspect of the presently disclosed subject matter, there is provided a method, the method comprising: generating an ordinal decision-tree classifier having a plurality of levels, using processing circuitry, wherein at each level each node of the ordinal decision-tree classifier is connected to a plurality of child nodes via respective edges, wherein each edge at each given level of the levels represents a respective distinct value or range of values of a splitting attribute, and wherein the splitting attribute is selected taking into account an ordinality of classes of an ordinal class variable.

In accordance with a fifth aspect of the presently disclosed subject matter, there is provided a non-transitory computer readable storage medium having computer readable program code embodied therewith, the computer readable program code, executable by processing circuitry of a computer to perform a method, the method comprising: obtaining, by processing circuitry, an ordinal decision-tree classifier generated by taking into account an ordinality of classes of an ordinal class variable having at least three classes; and classifying an input record to a given class of the classes using the ordinal decision-tree classifier.

In accordance with a sixth aspect of the presently disclosed subject matter, there is provided a non-transitory computer readable storage medium having computer readable program code embodied therewith, the computer readable program code, executable by processing circuitry of a computer to perform a method, the method comprising: generating an ordinal decision-tree classifier having a plurality of levels, using processing circuitry, wherein at each level each node of the ordinal decision-tree classifier is connected to a plurality of child nodes via respective edges, wherein each edge at each given level of the levels represents a respective distinct value or range of values of a splitting attribute, and wherein the splitting attribute is selected taking into account an ordinality of classes of an ordinal class variable.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
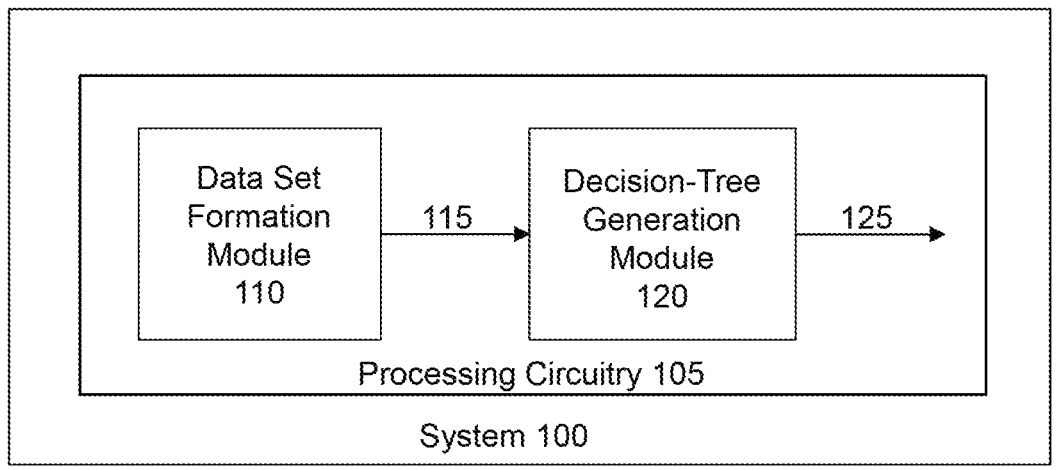
FIG. 1 is a block diagram schematically illustrating one example of a system for generating an ordinal decision-tree classifier, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "classifying", "connecting". "selecting", "calculating", "generating", "repeating", "performing", "allocating", "splitting" or the like, include actions and/or processes, including, inter alia, actions and/or processes of a computer, that manipulate and/or transform data into other data, said data represented as physical quantities, e.g. such as electronic quantities, and/or said data representing the physical objects. The terms "computer", "processor", "processing circuitry" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 4:
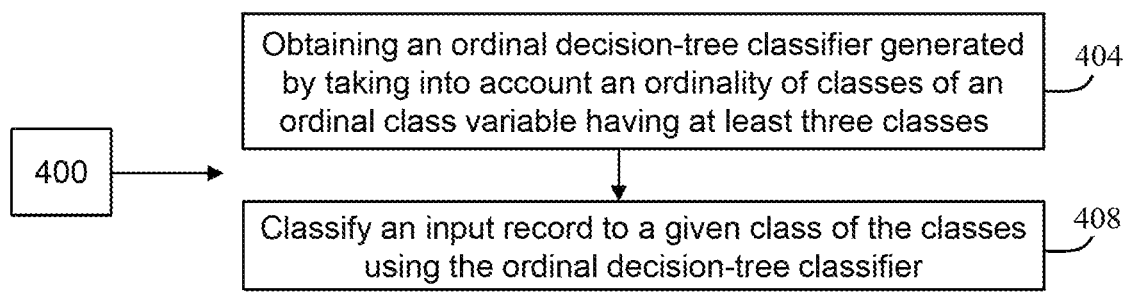
FIG. 4 is a flowchart illustrating one example of a sequence of operations for ordinal classification, in accordance with the presently disclosed subject matter.

In embodiments of the presently disclosed subject matter, fewer, more and/or different stages than those shown in FIG. 4 may be executed. In embodiments of the presently disclosed subject matter, one or more stages illustrated in FIGS.

Figure 2:
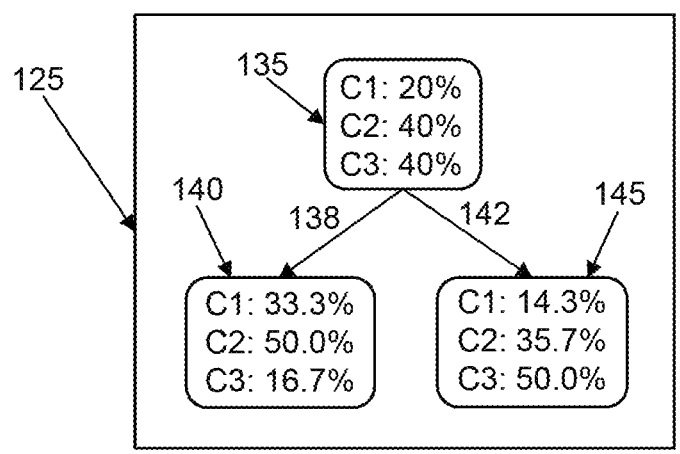
FIG. 2 is an example of a two-level ordinal decision-tree classifier, in accordance with the presently disclosed subject matter.
Figure 3:
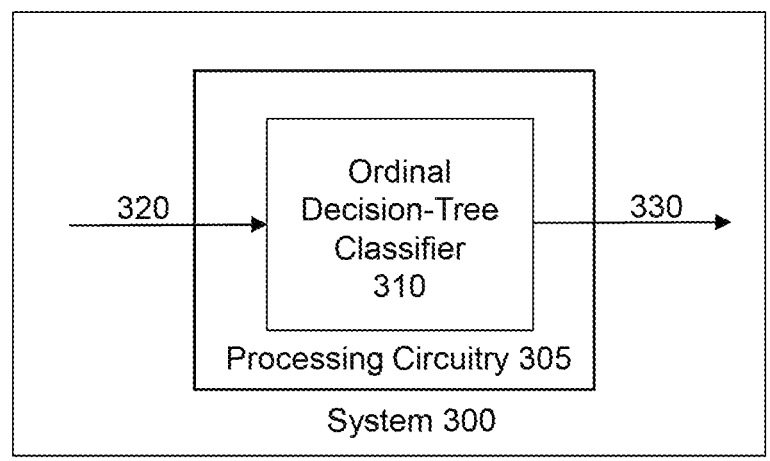
FIG. 3 is a block diagram schematically illustrating one example of an ordinal classification system, in accordance with the presently disclosed subject matter.

4, 5 and 6A-6B may be executed in a different order and/or one or more groups of stages may be executed simultaneously. FIGS. 1-3 illustrate a general schematic of the system architecture in accordance with embodiments of the presently disclosed subject matter. Each module in FIGS. 1 and 3 can be made up of any combination of software, hardware and/or firmware that performs the functions as defined and explained herein. The modules in FIGS. 1 and 3 may be centralized in one location or dispersed over more than one location. In other embodiments of the presently disclosed subject matter, the system may comprise fewer, more, and/or different modules than those shown in FIGS. 1 and 3.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, a block diagram schematically illustrating one example of a system 100 for generating an ordinal decision-tree classifier 125, in accordance with the presently disclosed subject matter.

In accordance with the presently disclosed subject matter, system 100 can be configured to include processing circuitry 105. Processing circuitry 105 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant system 100 resources and for enabling operations related to system 100 resources.

Processing circuitry 105 can be configured to include, optionally, a data set formation module 110. Also, processing circuitry 105 can be configured to include a decision-tree generation module 120.

Data set formation module 110 can be configured to form a data set 115 that includes a plurality of records. In some cases, at least one record of the records can be obtained (e.g., received or retrieved) from one or more data repositories accessible by the system 100 in any manner (e.g. via a wired/wireless connection, or off-line, e.g. using appropriate hardware such as hard disk drives). Additionally, or alternatively, in some cases, at least one record of the records can be formed by data set formation module 110 based on data that is obtained (e.g., received or retrieved) from one or more data repositories accessible by the system 100 in any manner (e.g. via a wired/wireless connection, or off-line, e.g. using appropriate hardware such as hard disk drives).

Each record of the records in the data set 115 is indicative of a relationship between a plurality of attribute values of a corresponding plurality of attributes and a class of an ordinal class variable, the ordinal class variable having at least three classes. Each attribute of the attributes has one of two or more possible attribute values. The attribute values can be one or more of: discrete values or a range of values.

In some cases, each record of the records in the data set 115 can be indicative of a relationship between a plurality of attribute values (discrete values and/or a range of values) of a corresponding plurality of investment-related attributes and a past return (e.g., hard loss, loss, medium profit, high profit) on a group of one or more investments (e.g., a single investment, a mutual fund, etc.).

In some cases, each record of the records in the data set 115 can be indicative of a relationship between a plurality of attribute values (discrete values and/or a range of values) of a corresponding plurality of retail-related attributes and a past value (e.g., loss, break-even, low profit, high profit) of one or more retail transactions.

In some cases, the attributes can be attributes related to loans, attributes related to bugs or manufacturing defects, or attributes related to reservations, and the corresponding ordinal class variable can be a risk level of one or more loans, a severity of one or more bugs or manufacturing defects, or a priority level of one or more reservations, respectively.

Decision-tree generation module 120 can be configured to obtain data set 115, and to generate an ordinal decision-tree classifier 125 based thereon. In some cases, as an alternative to obtaining data set 115 from data set formation module 110, decision-tree generation module 120 can be configured to obtain data set 115 from a location that is external to system 100, e.g. via a centralized computerized system.

Ordinal decision-tree classifier 125 can be configured to have a plurality of levels. Each level of ordinal decision-tree classifier 125 can be configured to have one or more nodes, each node of the nodes representing a probability distribution of the classes of an ordinal class variable within a data set associated with the node, being the data set 115 or a subset of the data set 115. Each record of the records in a respective subset of the data set 115 is indicative of a relationship between one or more attribute values of a corresponding one or more attributes and a class of the ordinal class variable. Each attribute of the attributes has one of two or more possible attribute values. The attribute values can be one or more of: discrete values or a range of values.

Each node at each level of the ordinal decision-tree classifier 125 can be connected to a plurality of child nodes, if any, via respective edges, each edge of the edges connecting the respective node to a respective child node of the child nodes and representing a respective attribute value of a splitting attribute for the node, the respective attribute value being a distinct value or a range of values. Moreover, each node at each level of the ordinal decision-tree classifier 125 can be connected to a parent node, if any, via a respective edge that represents a respective attribute value of a splitting attribute for the parent node, the respective attribute value being a distinct value or a range of values.

For illustrative purposes only, attention is now briefly drawn to FIG. 2, an example of a two-level ordinal decision-tree classifier 125, in accordance with the presently disclosed subject matter.

In the ordinal decision-tree classifier 125 of FIG. 2, a first level of the ordinal decision-tree classifier 125 includes a node 135, and a second level of ordinal decision-tree classifier includes a first child node 140 and a second child node 145. Node 135 represents a probability distribution of the classes of an ordinal class variable within a data set associated with node 135, the probability distribution being 20%, 40% and 40% for the classes C1, C2 and C3, respectively. First child node 140 represents a probability distribution of the classes of the ordinal class variable within a data set associated with first child node 140, being a first subset of the data set associated with node 135, the probability distribution of the classes within the data set associated with first child node 140 being 33.3%, 50.0% and 16.7% for the classes C1, C2 and C3, respectively. Second child node 145 represents a probability distribution of the classes of the ordinal class variable within a data set associated with second child node 145, being a second subset of the data set associated with node 135, the probability distribution of the classes within the data set associated with second child node 145 being 14.3%, 35.7% and 50.0% for the classes C1, C2 and C3, respectively.

Node 135 is connected to first child node 140 via a first edge 138 that represents a first attribute value of a splitting attribute for node 135, and is connected to second child node 145 via a second edge 142 that represents a second attribute value of the splitting attribute for node 135.

Returning to FIG. 1, decision-tree generation module 120 can be configured to select a splitting attribute for each node of ordinal decision-tree classifier 125, provided that a stopping criterion for inhibiting a split of the respective node has not been reached, by taking into account an ordinality of the classes of the ordinal class variable. Decision-tree generation module 120 is configured to select the splitting attributes of ordinal decision-tree classifier 125 in accordance with a weighted information gain measure that accounts for the ordinality of the classes, as detailed further herein, inter alia with reference to FIGS. 5, 6A and 6B.

Attention is now drawn to FIG. 3, a block diagram schematically illustrating one example of an ordinal classification system 300, in accordance with the presently disclosed subject matter.

In accordance with the presently disclosed subject matter, ordinal classification system 300 can be configured to include processing circuitry 305. Processing circuitry 305 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant system 300 resources and for enabling operations related to system 300 resources.

Figure 5:
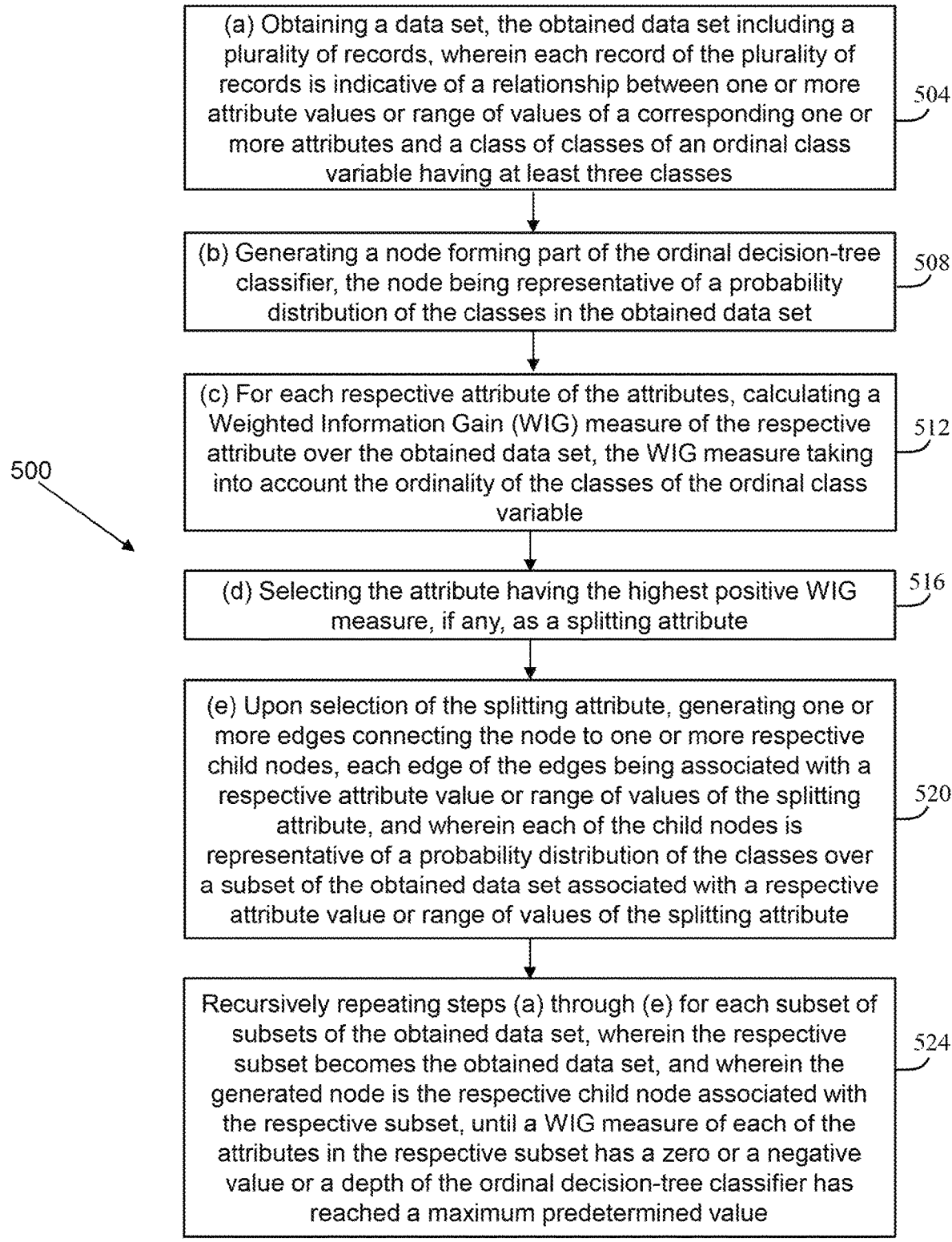
FIG. 5 is a flowchart illustrating one example of a sequence of operations for generating an ordinal decision-tree classifier, in accordance with the presently disclosed subject matter.
Figure 6A:
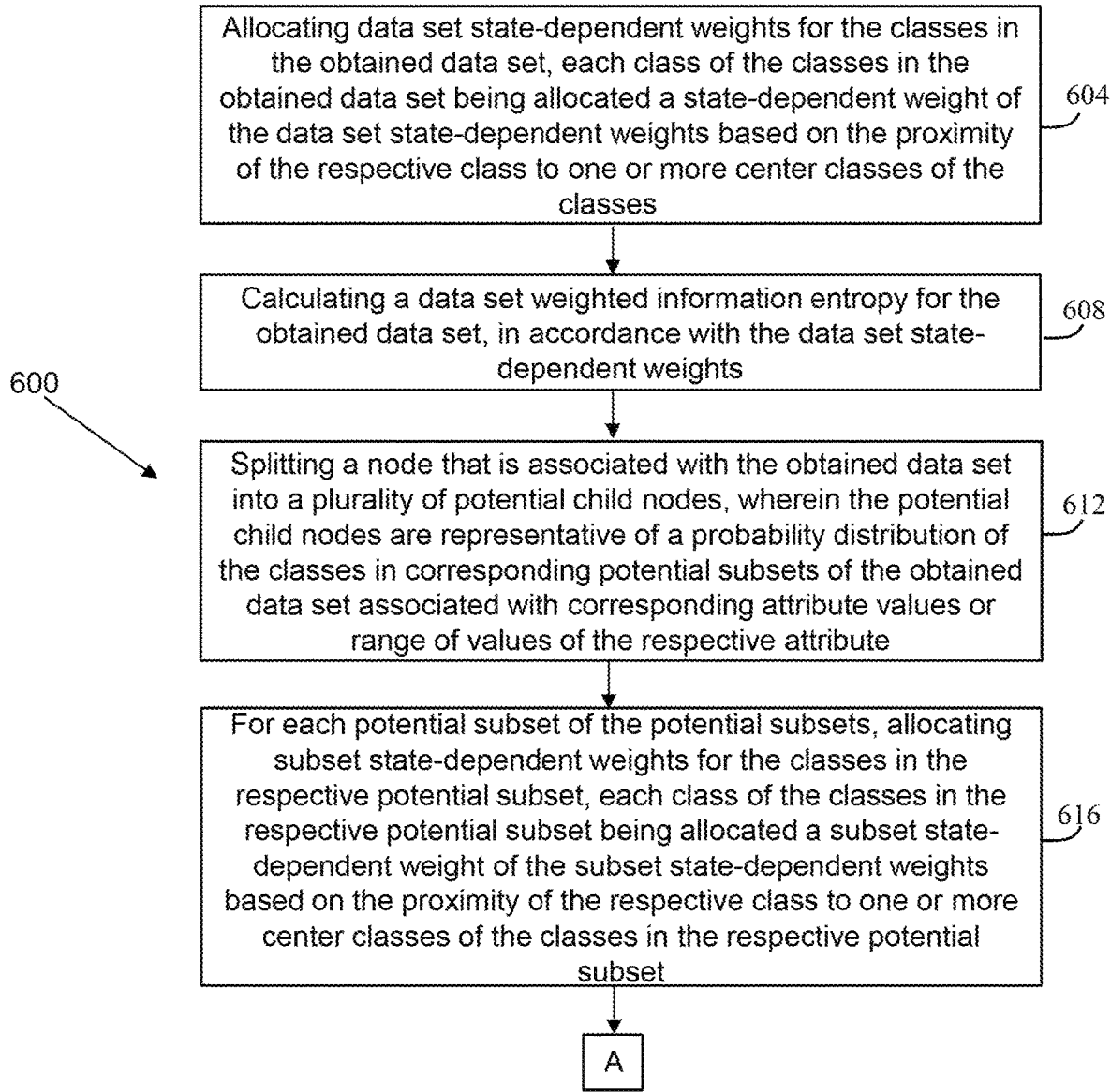
FIGS. 6A and 6B is a flowchart illustrating one example of a sequence of operations for calculating a weighted information gain measure for a respective attribute over an obtained data set, in accordance with the presently disclosed subject matter.
Figure 6B:
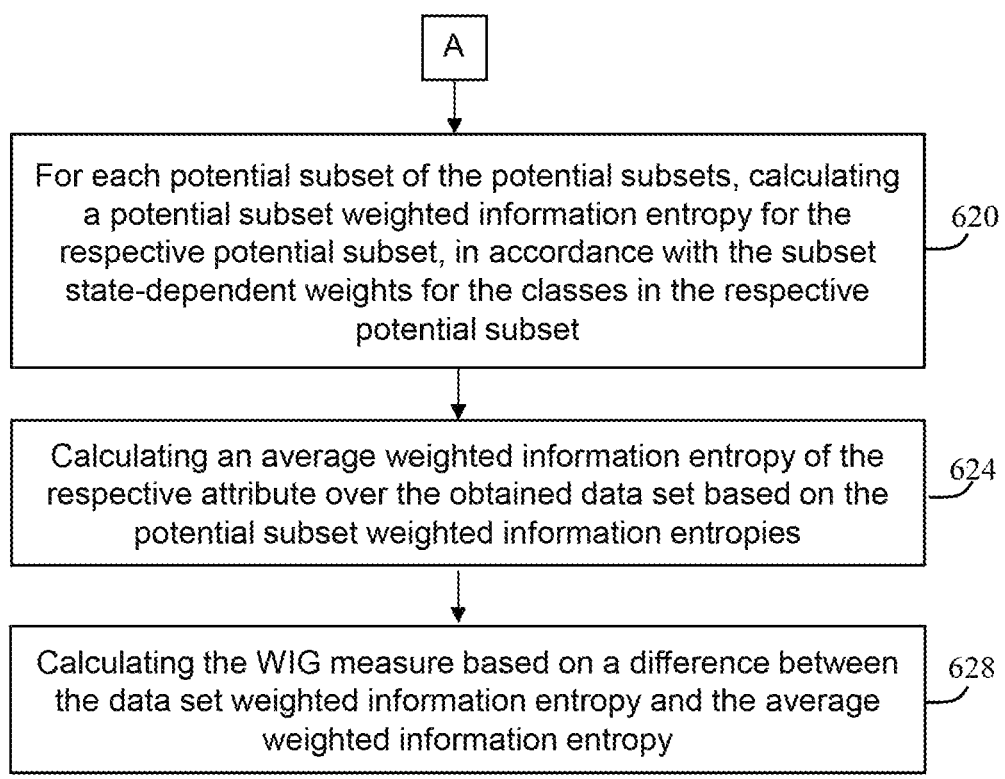

Processing circuitry 305 can be configured to obtain an ordinal decision-tree classifier 310 (for example, ordinal decision-tree classifier 125) generated by taking into account an ordinality of classes of an ordinal class variable having at least three classes, as detailed earlier herein, inter alia with reference to FIG. 1, and as detailed further herein, inter alia with reference to FIGS. 5, 6A and 6B. It is to be noted that in some cases processing circuitry 305 and processing circuitry 105 can be the same processing circuitry, whereas in other cases they can be different independent processing circuitries. It is to be further noted that in some cases, the ordinal decision-tree classifier 310 can be generated by the ordinal classification system 300, while in other cases, it can be generated by, and obtained from, another system (other than the ordinal classification system 300, such as system 100).

Ordinal decision-tree classifier 310 can be configured to classify an input record 320 that is input to ordinal decision-tree classifier 310 for classification to a given class of the classes (e.g. an input record 320 that represents a certain investment can be classified to one of the following classes: loss/medium profit/high profit), thereby providing a classified input record 330 corresponding to input record 320. The input record 320 can include one or more attribute values of a corresponding one or more attributes. The attribute values can be one or more of: discrete values or a range of values.

In some cases, in which ordinal decision-tree classifier 310 is generated using a retail-related data set comprising records associated with past retail transactions, the input record can be a current retail transaction to be classified to a retail transaction class (for example, low profit, medium profit, or high profit).

In some cases, in which ordinal decision-tree classifier 310 is generated using an investment-related data set comprising records associated with past investments, the input record can be a current investment to be classified to a returns-on-investment class (for example, loss, medium profit, or high profit).

In some cases, the input record can be one or more of: a current loan to be classified to a loan risk class (e.g., low risk, medium risk, or high risk), a current bug or manufacturing defect to be classified to a class associated with the severity of the current bug or manufacturing defect (e.g., low severity, medium severity, or high severity), or a current reservation to be classified to a class associated with the priority level of the current reservation (e.g., low priority, medium priority, or high priority).

Attention is now drawn to FIG. 4, a flowchart illustrating one example of a sequence of operations for ordinal classification 400, in accordance with the presently disclosed subject matter.

In the illustrated example, ordinal classification system 300 can be configured to obtain ordinal decision-tree classifier 310, using processing circuitry 305, the ordinal decision-tree classifier 310 being generated by taking into account an ordinality of classes of an ordinal class variable having at least three classes, as detailed earlier herein, inter alia with reference to FIG. 1, and as detailed further herein, inter alia with reference to FIGS. 5, 6A and 6B (block 404).

Processing circuitry 305 can be configured to classify an input record 320 to a given class of the classes using ordinal decision-tree classifier 310, as detailed earlier herein, inter alia with reference to FIG. 3 (block 408).

It is to be noted that, with reference to FIG. 4, some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

Attention is now drawn to FIG. 5, a flowchart illustrating one example of a sequence of operations 500 for generating an ordinal decision-tree classifier 125 using decision-tree generation module 120, in accordance with the presently disclosed subject matter.

In accordance with the presently disclosed subject matter, decision-tree generation module 120 can be configured to generate the ordinal decision-tree classifier 125 in accordance with steps (a)-(f) provided below.

In step (a), decision-tree generation module 120 can be configured to obtain a data set, being data set 115 or a subset of data set 115, the obtained data set including a plurality of records, wherein each record of the plurality of records is indicative of a relationship between one or more attribute values of a corresponding one or more attributes and a class of classes of an ordinal class variable having at least three classes (block 504). Each attribute of the attributes has one of two or more possible attribute values. The attribute values can be one or more of: discrete values or a range of values.

In some cases, each record of the records can be indicative of a relationship between one or more attribute values (discrete values and/or a range of values) of a corresponding one or more investment-related attributes and a past return (e.g., hard loss, loss, medium profit, high profit) on a group of one or more investments (e.g., a single investment, a mutual fund, etc.).

In some cases, each record of the records can be indicative of a relationship between one or more attribute values (discrete values and/or a range of values) of a corresponding one or more retail-related attributes and a past value (e.g., loss, break-even, low profit, high profit) of one or more retail transactions.

In some cases, the attributes can be attributes related to loans, attributes related to bugs or manufacturing defects, or attributes related to reservations, and the corresponding ordinal class variable can be a risk level of one or more loans, a severity of one or more bugs or manufacturing defects, or a priority level of one or more reservations, respectively.

In step (b), decision-tree generation module 120 can be configured to generate a node (e.g., node 135 of FIG. 2) forming part of the ordinal decision-tree classifier 125, the node being representative of a probability distribution of the classes in the obtained data set (block 508).

In step (c), for each respective attribute of the attributes in the obtained data set, ordinal decision-tree generator 120 can be configured to calculate a Weighted Information Gain (WIG) measure of the respective attribute over the obtained data set, as detailed further herein, inter alia with reference to FIGS. 6A and 6B, the WIG measure taking into account the ordinality of the classes of the ordinal class variable (block 512).

In step (d), decision-tree generation module 120 can be configured to select the attribute in the obtained data set having the highest positive WIG measure, if any, as a splitting attribute (block 516), thereby enabling accounting for the reward values and/or the risk effects of the classes of the ordinal class variable when selecting a splitting attribute.

In step (e), upon selection of the splitting attribute, decision-tree generation module 120 can be configured to generate one or more edges (e.g., edges 138 and 142 of FIG. 2) connecting the node (e.g., node 135 of FIG. 2) to one or more respective child nodes (e.g., nodes 140 and 145 of FIG. 2), each edge of the edges being associated with a respective attribute value or range of values of the splitting attribute, and wherein each of the child nodes (e.g., nodes 140 and 145 of FIG. 2) is representative of a probability distribution of the classes (e.g., C1, C2 and C3 of FIG. 2) over a subset of the obtained data set associated with a respective attribute value or range of values of the splitting attribute (block 520).

In step (f), decision-tree generation module 120 can be configured to recursively repeat steps (a) through (e) for each subset of subsets of the obtained data set, wherein the respective subset becomes the obtained data set, and wherein the generated node is the respective child node associated with the respective subset, until a stopping criterion for inhibiting a split of the generated node has been reached. The stopping criterion can be either that the WIG measure of each of the attributes in the respective subset has a zero or a negative value or a depth of the ordinal decision-tree classifier 125 has reached a maximum predetermined value (block 524).

Figure 7:
FIG. 7 illustrates a non-limiting example of pseudo-code representing a recursive function that can be used to build an ordinal decision tree classifier.

Attention is momentarily drawn in this respect to FIG. 7, which illustrates a non-limiting example of pseudo-code 700 representing a recursive function that can be used to build the ordinal decision tree classifier 125. In the pseudo code, D is an obtained data set, wMax is a highest weighted information gain ratio (WIGR, which is a WIG measure—see the description of FIG. 6B) of the attributes of the obtained data set for which WIGR has been calculated, jMax is an index of the respective attribute of the obtained data set (as a non-limiting example, the seventh attribute or the tenth attribute) with the highest WIGR), $\alpha_{jMax}$ is a number of attribute values or range of values of a respective attribute in the obtained data set, and $D_{jMax}^r$ is a number of subsets of the obtained data set associated with attribute values or range of values of the splitting attribute.

It is to be noted that, with reference to FIG. 5, some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

Attention is now drawn to FIGS. 6A and 6B, a flowchart illustrating one example of a sequence of operations 600 for calculating a weighted information gain measure of a respective attribute over an obtained data set, in accordance with the presently disclosed subject matter. The obtained data set can be data set 115 or a subset of data set 115.

In accordance with the presently disclosed subject matter, decision-tree generation module 120 can be configured to allocate non-negative data set state-dependent weights for the classes in the obtained data set, each class of the classes in the obtained data set being allocated a state-dependent weight of the data set state-dependent weights based on the proximity of the respective class to one or more center classes of the classes (block 604). In some cases, each state-dependent weight of the data set state-dependent weights is allocated for each class of the classes in the obtained data set based on a difference between a reward value of the respective class and a reward value associated with one or more center classes of the classes. The center class or classes is/are the class or classes representing the center of the population. In this manner, the state-dependent weight of each respective class is allocated based on the proximity of the respective class to the one or more center classes of the classes. This increases the likelihood that a splitting attribute selected for the obtained data set will be the attribute of the obtained data set that results in a highest probability of occurrence for reward values for the center class or classes and one or more classes adjacent to the center class or classes.

In some cases, each state dependent weight, $k_i(D)$, of the data set state-dependent weights, can be calculated as follows:

$$k_i(D) = \beta \left( \frac{|V(C_i) - V(C^m(D))|^\alpha}{\sum_{i=1}^{n} |V(C_i) - V(C^m(D))|^\alpha} \right),$$

wherein D is the obtained data set, wherein $V(C_i)$ is a reward value of the given class in the obtained data set, wherein $V(C^m(D))$ is a reward value of a center class or classes (for example, the mode value, the mean value or an extrapolation of the values of the classes) in the obtained data set, wherein n is the number of classes in the obtained data set, wherein $\alpha$ is a normalization factor that represents units of a gain value, $\alpha$ being greater than zero, and wherein $\beta$ is a non-zero constant.

To further explain Equation 1, it is assumed for simplicity that the interval between each of the classes in the obtained data set is constant (for example, if the ordinal class variable is profit level, C1 represents a 50% loss, C2 represents breaking even, and C3 represents a 50% profit), such that the reward values of the classes C1, C2 and C3 of the ordinal class variable can be given the values 1, 2 and 3, respectively.

In some cases, in which there is one center class in the obtained data set, $V(C^m(D))$ can be a reward value of the center class. For example, for a data set in which classes C1, C2 and C3 have a probability distribution of 20%, 50% and 30%, respectively, $V(C^m(D))$ can be 2.

In some cases, in which there are two or more center classes in the obtained data set, $V(C^m(D))$ can an average of the reward values of the center classes. For example, for a data set in which classes C1, C2 and C3 have a probability distribution of 20%, 40% and 40%, respectively, $V(C^m(D))$ can be 2.5.

In some cases, $V(C^m(D))$ can be an extrapolation of the reward values. For example, for a data set in which classes C1, C2 and C3 have a probability distribution of 20%, 40% and 40%, respectively, $V(C^m(D))$ can be $0.2*1+0.4*2+0.4*3=2.2$.

Returning to the sequence of operations 600, decision-tree generation module 120 can be configured to calculate a data set weighted information entropy for the obtained data set, in accordance with the data set state-dependent weights (block 608). The data set weighted information entropy can be calculated as follows:

$$WH(D) = -\sum_{i=1}^{n} k_i(D) p_i \log p_i, \quad \text{(Equation 2)}$$

wherein D is the obtained data set;

wherein $p_i$ is the probability for a record of the obtained data set to be associated with class $C_i$, wherein $k_i(D)$ is a data set state-dependent weight of class $C_i$ of the obtained data set, wherein log can optionally be a logarithm to base 2, and wherein n is the number of classes in the obtained data set.

In some cases, $0 \le k_i(D) \le 1$, and $\Sigma_{i=1}^{n} k_i(D)=1$.

Upon calculating the data set weighted information entropy, decision-tree generation module 120 can be configured to split the node in the ordinal decision-tree classifier 125 that is associated with the obtained data set into a plurality of potential child nodes, wherein the potential child nodes are representative of a probability distribution of the classes in corresponding potential subsets of the obtained data set associated with corresponding attribute values or range of values of the respective attribute (block 612).

For each potential subset of the potential subsets, decision-tree generation module 120 can be configured to allocate non-negative subset state-dependent weights for the classes in the respective potential subset, each class of the classes in the respective potential subset being allocated a subset state-dependent weight of the subset state-dependent weights based on the proximity of the respective class to one or more center classes of the classes of the respective potential subset (block 616). In some cases, each state-dependent weight of the subset state-dependent weights is allocated for each class of the classes in the respective potential subset based on a difference between a reward value of the respective class and a reward value associated with the one or more center classes of the classes of the respective potential subset. In some cases, each state-dependent weight, $k_i(D_j^r)$, of the subset state-dependent weights can be calculated as follows:

$$k_i(D_j^r) = \beta \left( \frac{|V(C_i) - V(C^m(D_j^r))|^\propto}{\sum_{i=1}^{n} |V(C_i) - V(C^m(D_j^r))|^\propto} \right), \quad \text{(Equation 3)}$$

wherein $D_j^r$ is the respective potential subset;

wherein $V(C_i)$ is a reward value of a respective class in the respective potential subset, wherein $V(C^m(D_j^r))$ is a reward value of a center class or classes (for example, the mode value, the mean value or an extrapolation of the values of the classes) in the respective potential subset, wherein n is the number of classes in the respective potential subset, wherein $\propto$ is a normalization factor that represents units of a gain value, $\propto$ being greater than zero, and wherein $\beta$ is a non-zero constant.

Returning to the sequence of operations 600, for each potential subset of the potential subsets, decision-tree generation module 120 can be configured to calculate a potential subset weighted information entropy for the respective potential subset, in accordance with the subset state-dependent weights for the classes in the respective potential subset (block 620). The potential subset weighted information entropy for a respective potential subset can be calculated as follows:

$$WH(D_j^r) = -\sum_{i=1}^{n} k_i(D_j^r) p_i \log p_i, \quad \text{(Equation 4)}$$

wherein $p_i$ is a probability for a record in the respective potential subset to be associated with class $C_i$, wherein $k_i(D_j^r)$ is a subset state-dependent weight of class $C_i$ of the respective potential subset, wherein log can optionally be a logarithm to base 2, and wherein n is the number of classes in the respective potential subset.

In some cases, $0 \le k_i(D_j^r) \le 1$, and $\Sigma_{i=1}^{n} k_i(D_j^r)=1$.

Decision-tree generation module 120 can be configured to calculate an average weighted information entropy of the respective attribute over the obtained data set based on the potential subset weighted information entropies of the potential subsets of the obtained data set (block 624). The average weighted information entropy can be calculated as follows:

$$WH_j(D) = \sum_{r=1}^{a_j} \frac{|D_j^r|}{|D|} \times WH(D_j^r), \quad \text{(Equation 5)}$$

where $$\frac{|D_j^r|}{|D|}$$

represents a proportion of the records of the obtained data set for which the respective attribute has a respective attribute value or range of values, $A_j^r$, wherein $a_j$ is the number of attribute values or range of values of the respective attribute, and wherein $WH(D_j^r)$ is the potential subset weighted information entropy for a respective potential subset of the potential subsets.

Decision-tree generation module 120 can be configured to calculate the WIG measure based on a difference between the data set weighted information entropy and the average weighted information entropy of the respective attribute over the obtained data set (block 628).

In some cases, the WIG measure is a weighted information gain (WIG), and decision-tree generation module 120 can be configured to calculate the WIG as follows:

$$WIG_j(D) = WH(D) - WH_j(D), \quad \text{(Equation 6)}$$

wherein WH(D) is the data set weighted information entropy, and wherein $WH_j(D)$ is the average weighted information entropy of the respective attribute over the obtained data set.

In some cases, the WIG measure is a normalized weighted information gain ratio (WIGR), and decision-tree generation module 120 can be configured to calculate the normalized WIGR as follows:

$$WIGR_j(D) = \frac{WIG_j(D)}{H_j(D)}, \quad \text{(Equation 7)}$$

wherein $WIG_j(D)$ is a WIG, as defined above, and wherein $H_j(D)$ is a partition entropy of the respective attribute, the decision-tree generation module 120 being configured to calculate $H_j(D)$ as follows:

$$H_j(D) = -\sum_{r=1}^{a_j} \frac{|D_j^r|}{|D|} \times \log\left(\frac{|D_j^r|}{|D|}\right), \quad \text{(Equation 8)}$$

wherein $$\frac{|D_j^r|}{|D|}$$

represents a proportion of the records of the data set for which the respective attribute has a respective attribute value or range of values, $A_j^r$, wherein $a_j$ is the number of attribute values or range of values of the respective attribute, and wherein log can optionally be a logarithm to base 2.

It is to be noted that, with reference to FIGS. 6A and 6B, some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A system, the system comprising processing circuitry configured to:
    obtain an ordinal decision-tree classifier generated by taking into account an ordinality of classes of an ordinal class variable having at least three classes, wherein:
    (a) the ordinal decision-tree classifier has a plurality of levels, at each level each node is connected to a plurality of child nodes, if any, via respective edges, each edge of the edges connecting a given node to its respective child node and representing a respective distinct value or range of values of a splitting attribute;
    (b) the splitting attribute is selected taking into account the ordinality of the classes of the ordinal class variable; and
    (c) each node represents a probability distribution of the classes of the ordinal class variable within a respective node data set, being a respective subset of the node data set of a parent node thereof, if any, wherein the subset is selected in accordance with the splitting attribute value or range of values of the parent node; and
    classify an input record to a given class of the classes using the ordinal decision-tree classifier.

2. The system of claim 1, wherein the splitting attribute is selected to be an attribute of the parent node having the highest positive information gain measure, wherein the information gain measure is calculated by allocating state-dependent weights for the classes, wherein each of the state dependent weights is based on a proximity of the corresponding class to a center of the classes.

3. The system of claim 1, wherein the processing circuitry is further configured to perform the following for generating the obtained ordinal decision-tree classifier:
    (a) obtain a data set, the obtained data set including a plurality of records, wherein each record of the plurality of records is indicative of a relationship between one or more attribute values or range of values of a corresponding one or more attributes and a class of the classes of the ordinal class variable;
    (b) generate a node forming part of the ordinal decision-tree classifier, the node being representative of a probability distribution of the classes in the obtained data set;
    (c) for each respective attribute of the attributes, calculate a Weighted Information Gain (WIG) measure of the respective attribute over the obtained data set, the WIG measure taking into account the ordinality of the classes of the ordinal class variable;

(d) select the attribute having the highest positive WIG measure, if any, as a splitting attribute;

(e) upon selection of the splitting attribute, generate one or more edges connecting the node to one or more respective child nodes, each edge of the edges being associated with a respective attribute value or range of values of the splitting attribute, and wherein each of the child nodes is representative of a probability distribution of the classes over a subset of the obtained data set associated with a respective attribute value or range of values of the splitting attribute; and (f) recursively repeat steps (a) through (e) for each subset of subsets of the obtained data set, wherein the respective subset becomes the obtained data set, and wherein the generated node is the respective child node associated with the respective subset, until a WIG measure of each of the attributes in the respective subset has a zero or a negative value or a depth of the ordinal decision-tree classifier has reached a maximum predetermined value.

4. The system of claim 3, wherein the processing circuitry is further configured to perform the following in order to calculate the WIG measure of the respective attribute over the obtained data set:

allocate data set state-dependent weights for the classes in the obtained data set, each class of the classes in the obtained data set being allocated a state-dependent weight of the data set state-dependent weights based on the proximity of the respective class to one or more center classes of the classes in the obtained data set;

calculate a data set weighted information entropy for the obtained data set, in accordance with the data set state-dependent weights;

split the node into a plurality of potential child nodes, wherein the potential child nodes are representative of a probability distribution of the classes in corresponding potential subsets of the obtained data set associated with corresponding attribute values or range of values of the respective attribute;

for each potential subset of the potential subsets:
allocate subset state-dependent weights for the classes in the respective potential subset, each class of the classes in the respective potential subset being allocated a subset state-dependent weight of the subset state-dependent weights based on the proximity of the respective class to one or more center classes of the classes in the respective potential subset; and
calculate a potential subset weighted information entropy for the respective potential subset, in accordance with the subset state-dependent weights for the classes in the respective potential subset;

calculate an average weighted information entropy of the respective attribute over the obtained data set based on the potential subset weighted information entropies; and calculate the WIG measure based on a difference between the data set weighted information entropy and the average weighted information entropy.

5. The system of claim 4, wherein the processing circuitry is configured to calculate the data set weighted information entropy as follows:

$$WH(D) = -\sum_{i=1}^{n} k_i(D) p_i \log p_i,$$

wherein D is the obtained data set,
wherein $p_i$ is a probability of an appearance of a given class, $C_i$, of the classes in the obtained data set,
wherein $k_i(D)$ is a value of the data set state-dependent weight for the given class,
wherein n is the number of classes in the obtained data set, and
wherein $k_i(D)$ is calculated as follows:

$$k_i(D) = \beta\left(\frac{|V(C_i) - V(C^m(D))|^\alpha}{\sum_{i=1}^{n} |V(C_i) - V(C^m(D))|^\alpha}\right),$$

wherein $V(C_1)$ is a value of the given class,
wherein $V(C^m(D))$ is a value of a center class or classes in the obtained data set,
wherein $\alpha$ is a normalization factor that represents units of a gain value, $\alpha$ being greater than zero, and
wherein $\beta$ is a non-zero constant.

6. The system of claim 4, wherein the processing circuitry is configured to calculate the potential subset weighted information entropy for the respective potential subset as follows:

$$WH(D_j^r) = -\sum_{i=1}^{n} k_i(D_j^r) p_i \log p_i,$$

wherein $D_j^r$ is the respective potential subset,
wherein $p_i$ is a probability of an appearance of a given class, $C_i$, of the classes in the respective potential subset,
wherein $k_i(D_j^r)$ is a value of the subset state-dependent weight for the given class,
wherein n is the number of classes in the respective potential subset, and
wherein $k_i(D_j^r)$ is calculated as follows:

$$k_i(D_j^r) = \beta\left(\frac{|V(C_i) - V(C^m(D_j^r))|^\alpha}{\sum_{i=1}^{n} |V(C_i) - V(C^m(D_j^r))|^\alpha}\right),$$

wherein $V(C_i)$ is a value of the given class,
wherein $V(C^m(D_j^r))$ is a value of a center class or classes in the respective potential subset,
wherein $\alpha$ is a normalization factor that represents units of a gain value, $\alpha$ being greater than zero, and
wherein $\beta$ is a non-zero constant.

7. The system of claim 4, wherein the processing circuitry is configured to calculate the average weighted information entropy as follows:

$$WH_j(D) = \sum_{r=1}^{a_j} \frac{|D_j^r|}{|D|} \times WH(D_j^r),$$

wherein $$\frac{|D_j^r|}{|D|}$$

represents a proportion of the records of the data set for which the respective attribute has a respective attribute value or range of values, $A_j^r$, wherein $a_j$ is the number of attribute values or range of values of the respective attribute, and wherein $WH(D_j^r)$ is the potential subset weighted information entropy for a respective potential subset of the potential subsets.

8. The system of claim 4, wherein the WIG measure is a WIG, and wherein the processing circuitry is configured to calculate the WIG as follows:

$$WIG(D)=WH(D)-WH_j(D),$$

wherein WH(D) is the data set weighted information entropy, and wherein $WH_j(D)$ is the average weighted information entropy.

9. The system of claim 4, wherein the WIG measure is a normalized weighted information gain ratio (WIGR), and wherein the processing circuitry is configured to calculate the normalized WIGR as follows:

$$WIGR_j(D) = \frac{WIG_j(D)}{H_j(D)},$$

wherein $WIG_j(D)$ is a WIG,
wherein the processing circuitry is configured to calculate the WIG as follows:

$$WIG_j(D)=WH(D)-WH_j(D),$$

WH(D) being the data set weighted information entropy, and $WH_j(D)$ being the average weighted information entropy, and
wherein $H_j(D)$ is a partition entropy of the respective attribute, the processing circuitry being configured to calculate $H_j(D)$ as follows:

$$H_j(D) = -\sum_{r=1}^{a_j} \frac{|D_j^r|}{|D|} \times \log\left(\frac{|D_j^r|}{|D|}\right),$$

wherein $$\frac{|D_j^r|}{|D|}$$

represents a proportion of the records of the data set for which the respective attribute has a respective attribute value or range of values, $A_j^r$, and wherein $a_j$ is the number of attribute values or range of values of the respective attribute.

10. A method, the method comprising:
obtaining, by processing circuitry, an ordinal decision-tree classifier generated by taking into account an ordinality of classes of an ordinal class variable having at least three classes, wherein:
(a) the ordinal decision-tree classifier has a plurality of levels, at each level each node is connected to a plurality of child nodes, if any, via respective edges, each edge of the edges connecting a given node to its respective child node and representing a respective distinct value or range of values of a splitting attribute;
(b) the splitting attribute is selected taking into account the ordinality of the classes of the ordinal class variable; and
(c) each node represents a probability distribution of the classes of the ordinal class variable within a respective node data set, being a respective subset of the node data set of a parent node thereof, if any, wherein the subset is selected in accordance with the splitting attribute value or range of values of the parent node; and
classifying an input record to a given class of the classes using the ordinal decision-tree classifier.

11. The method of claim 10, wherein the splitting attribute is selected to be an attribute of the parent node having the highest positive information gain measure, wherein the information gain measure is calculated by allocating state-dependent weights for the classes, wherein each of the state dependent weights is based on a proximity of the corresponding class to a center of the classes.

12. The method of claim 10, further comprising:
generating the obtained ordinal decision-tree classifier, by the processing circuitry, the generating comprising:
(a) obtaining a data set, the obtained data set including a plurality of records, wherein each record of the plurality of records is indicative of a relationship between one or more attribute values or range of values of a corresponding one or more attributes and a class of the classes of the ordinal class variable;
(b) generating a node forming part of the ordinal decision-tree classifier, the node being representative of a probability distribution of the classes in the obtained data set;
(c) for each respective attribute of the attributes, calculating a Weighted Information Gain (WIG) measure of the respective attribute over the obtained data set, the WIG measure taking into account the ordinality of the classes of the ordinal class variable;
(d) selecting the attribute having the highest positive WIG measure, if any, as a splitting attribute;
(e) upon selection of the splitting attribute, generating one or more edges connecting the node to one or more respective child nodes, each edge of the edges being associated with a respective attribute value or range of values of the splitting attribute, and wherein each of the child nodes is representative of a probability distribution of the classes over a subset of the obtained data set associated with a respective attribute value or range of values of the splitting attribute; and
(f) recursively repeating steps (a) through (e) for each subset of subsets of the obtained data set, wherein the respective subset becomes the obtained data set, and wherein the generated node is the respective child node associated with the respective subset, until a WIG measure of each of the attributes in the respective subset has a zero or a negative value or a depth of the ordinal decision-tree classifier has reached a maximum predetermined value.

13. The method of claim 12, wherein the calculating comprises:
allocating data set state-dependent weights for the classes in the obtained data set, each class of the classes in the obtained data set being allocated a state-dependent weight of the data set state-dependent weights based on the proximity of the respective class to one or more center classes of the classes in the obtained data set;
calculating a data set weighted information entropy for the obtained data set, in accordance with the data set state-dependent weights;
splitting the node into a plurality of potential child nodes, wherein the potential child nodes are representative of a probability distribution of the classes in corresponding potential subsets of the obtained data set associated with corresponding attribute values or range of values of the respective attribute;

for each potential subset of the potential subsets:
allocating subset state-dependent weights for the classes in the respective potential subset, each class of the classes in the respective potential subset being allocated a subset state-dependent weight of the subset state-dependent weights based on the proximity of the respective class to one or more center classes of the classes in the respective potential subset; and calculating a potential subset weighted information entropy for the respective potential subset, in accordance with the subset state-dependent weights for the classes in the respective potential subset;

calculating an average weighted information entropy of the respective attribute over the obtained data set based on the potential subset weighted information entropies; and calculating the WIG measure based on a difference between the data set weighted information entropy and the average weighted information entropy.

14. The method of claim 13, wherein the calculating of the data set weighted information entropy is performed as follows:

$$WH(D) = -\sum_{i=1}^{n} k_i(D) p_i \log p_i,$$

wherein D is the obtained data set,
wherein $p_i$ is a probability of an appearance of a given class, $C_i$, of the classes in the obtained data set,
wherein $k_i(D)$ is a value of the data set state-dependent weight for the given class,
wherein n is the number of classes in the obtained data set, and
wherein $k_i(D)$ is calculated as follows:

$$k_i(D) = \beta\left(\frac{|V(C_i) - V(C^m(D))|^\alpha}{\sum_{i=1}^{n} |V(C_i) - V(C^m(D))|^\alpha}\right),$$

wherein $V(C_i)$ is a value of the given class,
wherein $V(C^m(D))$ is a value of a center class or classes in the obtained data set,
wherein $\alpha$ is a normalization factor that represents units of a gain value, $\alpha$ being greater than zero, and
wherein $\beta$ is a non-zero constant.

15. The method of claim 13, wherein the calculating of the potential subset weighted information entropy for the respective potential subset is performed as follows:

$$WH(D_j^r) = -\sum_{i=1}^{n} k_i(D_j^r) p_i \log p_i,$$

wherein $D_j^r$ is the respective potential subset,
wherein $p_i$ is a probability of an appearance of a given class, $C_i$, of the classes in the respective potential subset, wherein $k_i(D_j^r)$ is a value of the subset state-dependent weight for the given class,
wherein n is the number of classes in the respective potential subset, and
wherein $k_i(D_j^r)$ is calculated as follows:

$$k_i(D_j^r) = \beta\left(\frac{|V(C_i) - V(C^m(D_j^r))|^\alpha}{\sum_{i=1}^{n} |V(C_i) - V(C^m(D_j^r))|^\alpha}\right),$$

wherein $V(C_i)$ is a value of the given class,
wherein $V(C^m(D_j^r))$ is a value of a center class or classes in the respective potential subset,
wherein $\alpha$ is a normalization factor that represents units of a gain value, of $\alpha$ being greater than zero, and
wherein $\beta$ is a non-zero constant.

16. The method of claim 13, wherein the WIG measure is a WIG, and wherein calculating of the WIG is performed as follows:

$$WIG_j(D) = WH(D) - (D),$$

wherein WH(D) is the data set weighted information entropy, and wherein $WH_j(D)$ is the average weighted information entropy.

17. The method of claim 13, wherein the WIG measure is a normalized weighted information gain ratio (WIGR), and wherein calculating of the normalized WIGR is performed as follows:

$$WIGR_j(D) = \frac{WIG_j(D)}{H_j(D)},$$

wherein $WIG_j(D)$ is a WIG,
wherein calculating of the WIG is performed as follows:

$$WIG_j(D) = WH(D) - WH_j(D),$$

WH(D) being the data set weighted information entropy, and $WH_j(D)$ being the average weighted information entropy, and
wherein $H_j(D)$ is a partition entropy of the respective attribute, and is calculated as follows:

$$H_j(D) = -\sum_{r=1}^{a_j} \frac{|D_j^r|}{|D|} \times \log\left(\frac{|D_j^r|}{|D|}\right),$$

wherein $$\frac{|D_j^r|}{|D|}$$

represents a proportion of the records of the data set for which the respective attribute has a respective attribute value or range of values, $A_j^r$, and wherein $a_j$ is the number of attribute values or range of values of the respective attribute.

18. A non-transitory computer readable storage medium having computer readable program code embodied therewith, the computer readable program code, executable by processing circuitry of a computer to perform a method, the method comprising:

obtaining, by processing circuitry, an ordinal decision-tree classifier generated by taking into account an ordinality of classes of an ordinal class variable having at least three classes, wherein:
(a) the ordinal decision-tree classifier has a plurality of levels, at each level each node is connected to a plurality of child nodes, if any, via respective edges, each edge of the edges connecting a given node to its respective child node and representing a respective distinct value or range of values of a splitting attribute;
(b) the splitting attribute is selected taking into account the ordinality of the classes of the ordinal class variable; and
(c) each node represents a probability distribution of the classes of the ordinal class variable within a respective node data set, being a respective subset of the node data set of a parent node thereof, if any, wherein the subset is selected in accordance with the splitting attribute value or range of values of the parent node; and
classifying an input record to a given class of the classes using the ordinal decision-tree classifier.

* * * * *